United States Patent
Sen et al.

(10) Patent No.: US 7,308,962 B2
(45) Date of Patent: Dec. 18, 2007

(54) CONTROL SYSTEM FOR CYLINDER CUT-OFF INTERNAL COMBUSTION ENGINE

(75) Inventors: Naoto Sen, Wako (JP); Tadayoshi Okada, Wako (JP); Akira Sugiyama, Wako (JP); Kenichi Nishida, Wako (JP); Yasuhiko Tomokuni, Wako (JP); Mahito Ishiyama, Wako (JP); Kazuo Yamashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 210 days.

(21) Appl. No.: 10/781,680

(22) Filed: Feb. 20, 2004

(65) Prior Publication Data

US 2004/0163866 A1 Aug. 26, 2004

(30) Foreign Application Priority Data

Feb. 26, 2003 (JP) .............................. 2003-049877

(51) Int. Cl.
*B60K 31/00* (2006.01)
*F02D 13/06* (2006.01)

(52) U.S. Cl. ................... 180/179; 180/167; 701/96
(58) Field of Classification Search ............... 180/170, 180/179, 167; 123/198 F; 701/96
See application file for complete search history.

(56) References Cited

U.S. PATENT DOCUMENTS

| | | | | |
|---|---|---|---|---|
| 4,151,824 A * | 5/1979 | Gilbert | ................... | 123/198 F |
| 4,188,933 A * | 2/1980 | Iizuka | .................... | 123/198 F |
| 5,594,645 A * | 1/1997 | Nishimura et al. | ........... | 701/96 |
| 6,122,588 A * | 9/2000 | Shehan et al. | ................ | 701/93 |
| 6,193,333 B1 * | 2/2001 | Guest | ......................... | 303/192 |
| 6,505,111 B1 * | 1/2003 | Tange et al. | .................. | 701/96 |
| 6,564,137 B2 * | 5/2003 | Minowa et al. | ............... | 701/70 |
| 6,594,574 B2 * | 7/2003 | Isogai et al. | .................. | 701/96 |
| 6,597,981 B2 * | 7/2003 | Nishira et al. | ................ | 701/96 |
| 6,665,603 B2 * | 12/2003 | Jindo et al. | .................... | 701/96 |

FOREIGN PATENT DOCUMENTS

| | | |
|---|---|---|
| JP | 05-071634 | 3/1993 |
| JP | 05-079364 A | 3/1993 |
| JP | 09-290665 | 11/1997 |
| JP | 10-103097 | 4/1998 |
| JP | 2001-317318 A | 11/2001 |
| JP | 2003-039976 | 2/2003 |
| JP | 2003-041959 | 2/2003 |
| JP | 2003-048461 | 2/2003 |
| JP | 2003-049694 | 2/2003 |

* cited by examiner

*Primary Examiner*—Frank Vanaman
(74) *Attorney, Agent, or Firm*—Arent Fox LLP

(57) ABSTRACT

In a control system for an internal combustion engine having a plurality of cylinders and mounted on a vehicle, in which the engine operation is switched based on the throttle opening between a full-cylinder operation in which all of the cylinders are operative and a cut-off cylinder operation in which some of the cylinders are inoperative, and a running control including at least a cruise control in which the vehicle runs at a desired vehicle velocity is conducted, the engine operation is switched to the full-cylinder operation when it is determined that deceleration is required in the running control, so as to increase pumping loss (engine loss). With this, it becomes possible to generate the deceleration sufficiently as desired, when, for example, the vehicle descends a downhill.

18 Claims, 4 Drawing Sheets

CONTROL SYSTEM FOR CYLINDER CUT-OFF INTERNAL COMBUSTION ENGINE

BACKGROUND OF THE INVENTION

1. Field of the Invention

This invention relates to a control system for a cylinder cut-off internal combustion engine in which fuel supply to some of the cylinders is cut off and running control such as cruise control is conducted therewith for the vehicle on which the engine is mounted.

2. Description of the Related Art

In a conventional multi-cylinder internal combustion engine having a plurality of cylinders, it has been proposed improving fuel consumption by switching engine operation based on the engine load, between a full-cylinder operation in which all of the cylinders are supplied with fuel to be operative and a cut-off cylinder operation in which some of the cylinders are cut off with fuel supply to be inoperative. In this type of cylinder cut-off internal combustion engine, since shock may sometimes be generated by torque fluctuation during engine operation changeover, it has also been proposed eliminating shock by adjusting the throttle opening during a transitional period of changeover, as taught in Japanese Laid-Open Patent Application No. Hei 10 (1998)-103097, for example.

It is also known to conduct running control to control a vehicle to cruise at a desired vehicle velocity set by the operator. A similar preceding vehicle follow-up control (so-called "adaptive cruise control") is known in which a vehicle is controlled to detect the distance between itself and a preceding vehicle using radar or the like, and to travel while maintaining a desired inter-vehicle distance between itself and the preceding vehicle. In these types of control, the vehicle velocity or inter-vehicle distance when the operator manipulates a corresponding setting switch is stored as a desired velocity or distance, and the throttle opening is adjusted via an actuator such that the vehicle runs at the stored desired velocity or the vehicle runs at a desired velocity necessary for maintaining the desired inter-vehicle distance between itself and the preceding vehicle, as disclosed, e.g., in Japanese Laid-Open Patent Application No. Hei 9 (1997)-290665.

Generally, in the cylinder cut-off engines, when a fuel cutoff condition (a condition for cutting off or discontinuing the supply of fuel) is satisfied when, for example, the throttle valve is fully closed while the cut-off cylinder operation is in progress, the supply of fuel is cut off. In a range of vehicle velocity in which running control such as the cruise control is feasible, therefore, if the fuel cutoff condition such as the case that throttle valve is fully closed is satisfied, the supply of fuel is stopped under the cut-off cylinder operation.

Aside from the above, when the engine is operated by the cut-off cylinder operation, pumping loss decreases. Here, the term "pumping loss" indicates power consumed in purging a cylinder of exhaust gas and sucking in a fresh air instead and hence, means loss in the engine. As a result, when the throttle valve is fully closed while the running control is in progress, since the engine operation is switched from the full-cylinder operation to the cut-off cylinder operation in which the engine loss (pumping loss) is decreased, the vehicle tends to decelerate not sharply, rather moderately. Unless vehicle deceleration is really required, such a moderate deceleration will be better for the operator, since the operator does not feel discomfort therefrom.

However, if the operator fully closes the throttle valve to really require deceleration when the running control is in progress, since the engine operation is switched to the cut-off cylinder operation in which vehicle deceleration is made smaller than that in the full-cylinder operation, the operator may not have the feel of sufficient deceleration as required. Specifically, when the vehicle runs a downhill, for example, since the engine loss does not reach a level enough for generating engine braking effect, it may sometimes fail to produce the deceleration as desired.

SUMMARY OF THE INVENTION

It is therefore an object of this invention to eliminate the defects described above and to provide a control system for a cylinder cut-off internal combustion engine in which operation is switched between the full-cylinder operation and the cut-off cylinder operation based on the engine load and in which running control is conducted, that can switch the engine operation such that the deceleration is sufficiently generated as desired.

In order to achieve the object, this invention provides a system for controlling an internal combustion engine having a plurality of cylinders and mounted on a vehicle, comprising: an engine operation controller that conducts a switching control of engine operation based on a load of the engine between a full-cylinder operation in which all of the cylinders are operative and a cut-off cylinder operation in which some of the cylinders are inoperative; and a running controller that conducts a running control of the vehicle; wherein the engine operation controller switches engine operation to the full-cylinder operation when it is determined that deceleration is required by the running controller.

BRIEF DESCRIPTION OF THE DRAWINGS

The above and other objects and advantages of the invention will be more apparent from the following description and drawings, in which.

DESCRIPTION OF THE PREFERRED EMBODIMENT

A control system for a cylinder cut-off internal combustion engine according to the embodiment of this invention will be described below with reference to the attached drawings.

Figure 1:
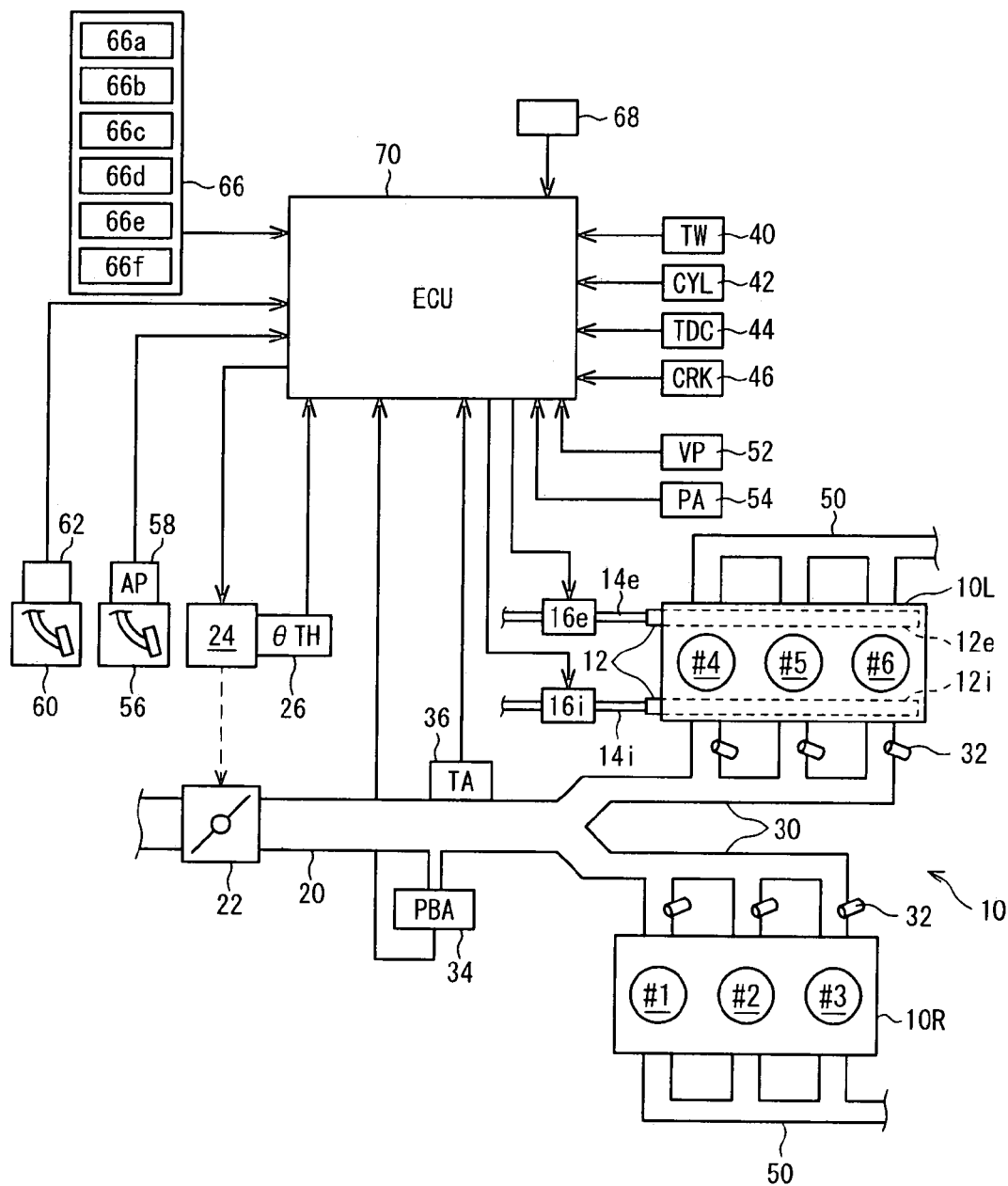
FIG. 1 is a schematic diagram showing the overall structure of a control system for a cylinder cut-off internal combustion engine according to an embodiment of this invention.

FIG. 1 is a schematic diagram showing the overall structure of a control system for a cylinder cut-off internal combustion engine according to the embodiment.

The reference symbol 10 in the drawing indicates a multi-cylinder internal combustion engine (to be referred to as "engine" below). The engine 10 is constituted as a four-cycle V-type six-cylinder DOHC engine having three cylinders #1, #2, #3 on a right bank 10R and three cylinders #4, #5, #6 on a left bank 10L. A cylinder cut-off mechanism 12 is provided on the left bank 10L of the engine 10.

The cylinder cut-off mechanism 12 comprises an intake side cut-off mechanism 12i for cutting off (closing) the intake valves (not shown) of the cylinders #4 through #6, and an exhaust side cut-off mechanism 12e for cutting off (closing) the exhaust valves (not shown) of the cylinders #4 through #6. The intake side cut-off mechanism 12i and exhaust side cut-off mechanism 12e are connected to a hydraulic pump (not shown) via respective oil passages 14i and 14e. Linear solenoids (electromagnetic solenoids) 16i and 16e are disposed at a point on the oil passages 14i and 14e respectively to supply (or block) the supply of oil pressure to the intake side cut-off mechanism 12i and exhaust side cut-off mechanism 12e.

The oil passage 14i of the intake side cut-off mechanism 12i is opened when the linear solenoid 16i is deenergized, and when oil pressure is supplied, the contact between the intake valves and intake cams (not shown) of the cylinders #4 through #6 is released such that the intake valves enter a cut-off state (a closed state). The oil passage 14e is opened when the linear solenoid 16e is deenergized, and when oil pressure is supplied to the exhaust side cut-off mechanism 12e, the contact between the exhaust valves and exhaust cams (not shown) of the cylinders #4 through #6 is released such that the exhaust valves enter a cut-off state (a closed state). As a result, operations of the cylinders #4 through #6 are cut off, and the engine 10 enters a cut-off cylinder operation in which the engine 10 is operated by the cylinders #1 through #3 alone.

Conversely, when the linear solenoid 16i is energized such that the oil passage 14i closes and the supply of hydraulic fluid to the intake side cut-off mechanism 12i is blocked, the intake valves and intake cams of the cylinders #4 through #6 come into contact, and the intake valves enter an operative state (so as to be opened/closed).

When the linear solenoid 16e is energized such that the oil passage 14e closes and the supply of hydraulic fluid to the exhaust side cut-off mechanism 12e is blocked, the exhaust valves and exhaust cams (not shown) of the cylinders #4 through #6 come into contact, and the exhaust valves enter an operative state (so as to be opened/closed). As a result, the cylinders #4 through #6 are operated and the engine 10 enters a full-cylinder operation. Thus, the engine 10 is constituted as a cylinder cut-off engine (internal combustion engine) which is capable of switching between the full-cylinder operation and the cut-off cylinder operation.

A throttle valve 22 is disposed on an intake pipe 20 of the engine 10 to adjust the amount of intake air. The throttle valve 22 is connected to an electric motor 24 such that the mechanical coupling with the accelerator pedal is severed, and is driven by the electric motor 24 to open and close. A throttle position sensor 26 is provided in the vicinity of the electric motor 24 and outputs a signal corresponding to the position or opening (to be referred to as "throttle opening" below) θTH of the throttle valve 22 in accordance with the amount of rotation of the electric motor 24.

Injectors (fuel injection valves) 32 are provided respectively in the vicinity of the intake ports of each cylinder #1 through #6 immediately after an intake manifold 30 disposed downstream of the throttle valve 22. The injectors 32 are connected to a fuel tank via a fuel supply pipe and a fuel pump (none of which are shown in the drawings), and and supplied with pressurized gasoline fuel from the fuel tank for injection.

A manifold absolute pressure sensor 34 and an intake air temperature sensor 36 are provided on the downstream side of the throttle valve 22 of the intake pipe 20 so as to output signals indicating an absolute pressure inside the intake pipe (indicative of the engine load) PBA and an intake air temperature TA respectively. A water temperature sensor 40 is attached to a cooling water passage (not shown) of the cylinder blocks of the engine 10 so as to output a signal corresponding to an engine cooling water temperature TW.

A cylinder discrimination sensor 42 is attached in the vicinity of the camshaft or crankshaft (not shown) of the engine 10, and outputs a cylinder discrimination signal CYL at a predetermined crank angle position of a specific cylinder (for example, #1). A TDC sensor 44 and a crank angle sensor 46 are also attached to the camshaft or crankshaft of the engine 10, and respectively output a TDC signal at a predetermined crank angle position relating to the TDC position of the piston of each cylinder and a CRK signal at shorter crank angle intervals (for example, thirty degrees) than the TDC signal.

The engine 10 is connected to an exhaust pipe (not shown) via an exhaust manifold 50, and the exhaust gas that is produced during combustion is discharged outside while being purified by a catalytic converter (not shown) provided at a point on the exhaust pipe. A vehicle velocity sensor 52 is disposed in the vicinity of a driveshaft (not shown), and outputs a signal at every predetermined rotation of the driveshaft. An atmospheric pressure sensor 54 is disposed in an appropriate position in the engine room (not shown), and outputs a signal indicating the atmospheric pressure PA at the location in which the vehicle is positioned.

An accelerator position sensor 58 is disposed in the vicinity of an accelerator pedal 56 which is installed on the floor surface of the operator's seat of the vehicle, and outputs a signal corresponding to a position (depression amount or accelerator opening) AP of the accelerator pedal 56 that is operated by the operator. A brake switch 62 is provided in the vicinity of a brake pedal 60, and outputs an ON signal when the operator depresses (manipulates) the brake pedal 60 to operate the brake.

A group of auto-cruise switches (generally assigned with reference numeral 66) is provided in the vicinity of a steering wheel (not shown) which is provided at the operator's seat of the vehicle.

The group of auto-cruise switches 66 is manipulated by the operator, and comprises various switches for inputting operator's instructions such as a desired vehicle velocity VD during running control. More specifically, this switch group comprises a setting switch 66a for inputting an instruction to conduct cruise control and a desired vehicle velocity, a resume switch 66b for inputting an instruction to resume running control after running control was interrupted by a brake operation or the like, a cancel switch 66c for inputting an instruction to cancel (end) running control, an accelerate switch 66d for inputting an instruction to conduct acceleration control to accelerate the vehicle, a decelerate switch 66e for inputting an instruction to conduct deceleration control to decelerate the vehicle, and a main switch 66f for enabling manipulation of the switches described above to be effective.

It should be noted that the switches described above may be disposed individually, or may be designed such that a plurality of instructions can be inputted by a combination of manipulations. Switches may be integrated such that when, for example, the setting switch is manipulated during execution of running control, a cancellation is indicated, and so on.

A radar 68 is provided in an appropriate position on the front bumper (not shown) or the like facing frontward of the vehicle. The radar 68 has a transmission unit and a reception unit (neither shown), such that electromagnetic waves are emitted frontward of the vehicle from the transmission unit and reflected by the preceding vehicle or the like. The reflected electromagnetic waves (reflected waves) are then received by the reception unit, whereby obstructions such as the preceding vehicle are detected.

The outputs of the various sensors and switches described above are transmitted to an ECU (Electronic Control Unit) 70.

The ECU 70 is constituted as a microcomputer comprising a CPU for performing control calculations, a ROM for storing a control calculation program and various data (tables and the like), a RAM for storing control calculation results from the CPU and so on temporarily, an input circuit, an output circuit, and a counter (none of which are shown in the drawing).

The ECU 70 detects the engine speed NE by counting the CRK signals outputted by the crank angle sensor 46 by the counter, and detects the vehicle velocity VP indicating the traveling velocity (speed) of the vehicle by counting the signals outputted by the vehicle velocity sensor 52 by the counter. The ECU 70 also detects the inter-vehicle distance and relative velocity of the subject vehicle and the preceding vehicle based on the signals from the radar 68, and calculates the desired vehicle velocity from the detected values.

Based on the inputted values, the ECU 70 executes control calculations to determine a fuel injection amount in order to open the injector 32, and to determine an ignition timing in order to control the ignition timing of an ignition device (not shown). Also on the basis of the inputted values, the ECU 70 determines a rotation amount (operating amount) of the electric motor 24 to regulate the throttle opening θTH, and determines whether or not to energize the solenoids 16i, 16e in order to switch operations of the engine 10 between the full-cylinder operation and the cut-off cylinder operation.

The ECU 70 also conducts running control on the basis of the inputted values, more specifically conducts cruise control to cause the vehicle to run at the desired vehicle velocity set by the operator and preceding vehicle follow-up control (inter-vehicle distance control) to cause the vehicle to run while maintaining a predetermined inter-vehicle distance between itself and the preceding vehicle.

As will be explained below, the ECU 70 also acts as an engine operation controller that conducts a switching control of engine operation based on a load of the engine (θTH) between a full-cylinder operation in which all of the cylinders are operative and a cut-off cylinder operation in which some of the cylinders are inoperative, and a running controller that conducts a running control including at least a cruise control in which the vehicle runs at a desired vehicle velocity and a preceding vehicle follow-up control in which the vehicle runs with a desired inter-vehicle distance from a preceding vehicle. More specifically, although not shown, the ECU 70 comprises a first ECU that inputs the outputs of the sensors and switches (except for those of the group of auto-cruise switches 66) and conducts the fuel injection and ignition timing control and the switching control of engine operation, and a second ECU that inputs some of the outputs of the sensors and switches (including those of the group of auto-cruise switches 66) to conduct the running control.

Next, operations of the control system for the cylinder cut-off internal combustion engine according to this embodiment will be described with reference to FIG. 2 onward.

Figure 2:
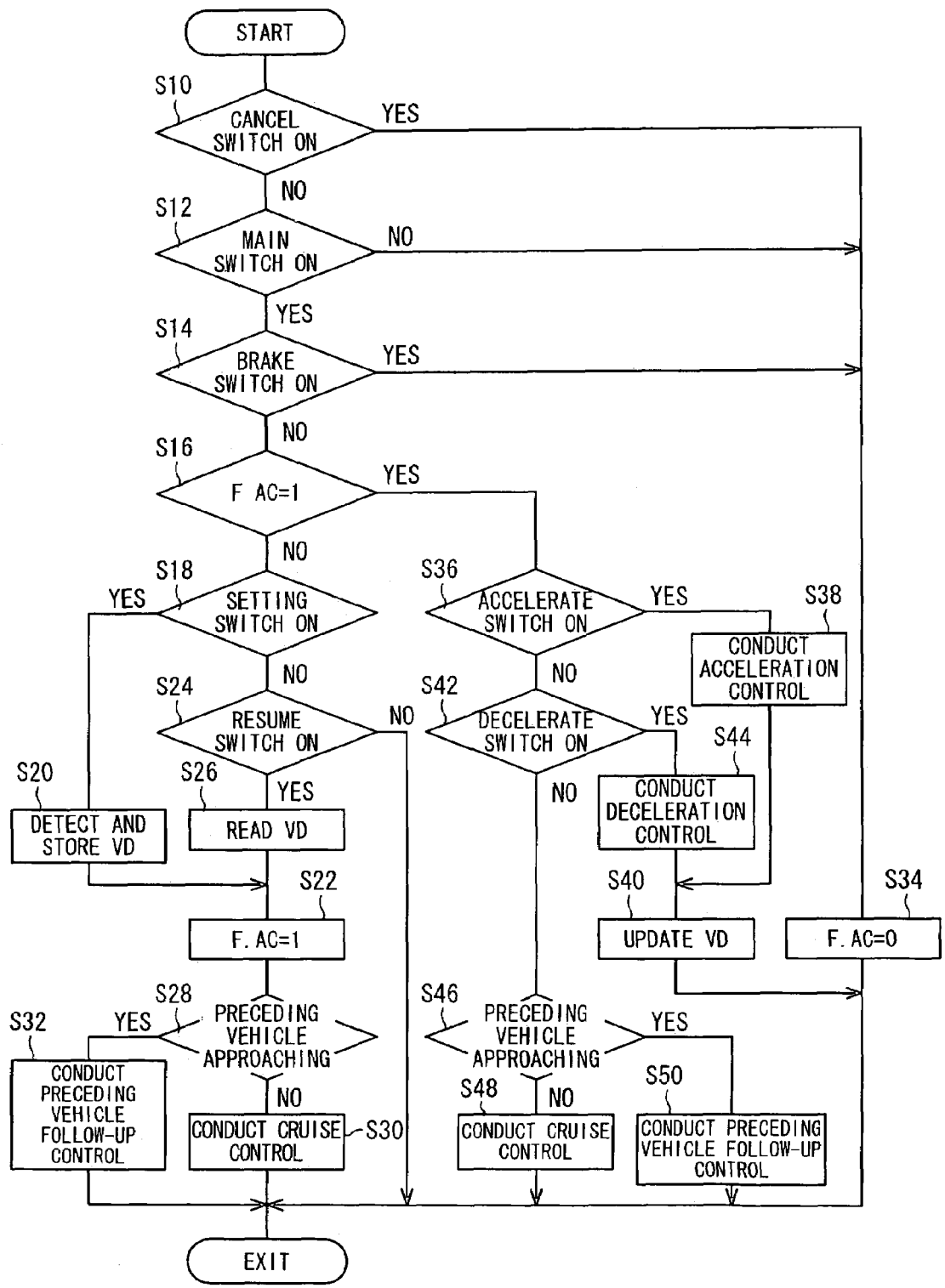
FIG. 2 is a flowchart showing a determination operation for conducting running control from among the operations of the system shown in FIG. 1.

FIG. 2 is a flowchart showing a determination operation for conducting running control, more specifically for cruise control and preceding vehicle follow-up control, from among the operations of the control system. The program shown in the diagram is executed (looped) at TDC (Top Dead Center) or a predetermined crank angle, or at predetermined time intervals, for example.

The program begins in S10 in which it is determined whether the cancel switch 66c is ON (manipulated), or in other words whether the running control cancellation (end) instruction is inputted by the operator. If the determination result is negative, the program advances to S12 in which it is determined whether the main switch 66f is ON (manipulated). If the determination result in S12 is affirmative, the program advances to S14 in which it is determined whether or not the brake switch is ON (manipulated), or in other words whether the brake pedal 60 has been depressed by the operator.

If the determination result in S14 is negative, the program advances to S16 in which it is determined whether the bit of a flag F.AC is set to 1. The bit of the flag F.AC (having an initial value of 0) is set to 1 in a subsequent step and when the bit is set to 1, it indicates that running control, in other words cruise control or preceding vehicle follow-up control (including acceleration and deceleration control performed by switch manipulation), in which the accelerator pedal 56 and brake pedal 60 need not be manipulated by the operator, is in progress. When the determination result in S16 is negative, the program advances to S18 in which it is determined whether the setting switch 66a is ON (manipulated), or in other words whether the instruction to conduct running control and a desired vehicle velocity are inputted by the operator.

If the determination result in S18 is affirmative, the program advances to S20 in which the desired vehicle velocity VD inputted through the setting switch 66a is read and stored, and then advances to S22 in which the flag F.AC bit is set to 1.

If the determination result in S18 is negative, the program advances to S24 in which a determination is made as to whether or not the resume switch 66b is ON (manipulated), or in other words whether the instruction to resume running control is inputted by the operator following the cancellation of running control (when the F.AC bit is reset to 0) caused by a brake manipulation. If the determination result of S24 is affirmative, the program advances to S26 in which the desired vehicle velocity VD stored before the F.AC bit was reset to 0 is read, and then advances to S22. When the determination result in S24 is negative, the F.AC bit is held at 0, and the program is terminated without restarting running control.

Next, the program advances to S28 in which it is determined whether the preceding vehicle is approaching within a desired inter-vehicle distance set by the manipulation of the setting switch 66a. If the determination result in S28 is negative, the program advances to S30 in which cruise control is conducted based on the stored desired vehicle velocity VD. More specifically, the amount of current supply (the manipulated variable, more precisely a current supply command value to the electric motor 24 for moving the throttle valve 22) is calculated based on a difference between the desired vehicle velocity VD and the current (detected) velocity VP using a PID controller or the like, whereupon this amount is outputted to the electric motor 24 to control the throttle opening θTH. It should be noted that when deceleration of a predetermined level or greater which cannot be responded to adequately by the throttle opening control is required during cruise control, a brake operation or a gear change (downshift) is conducted in conjunction with the throttle opening control to drive the same in a closing direction.

If the determination result in S28 is affirmative, the program advances to S32 in which preceding vehicle follow-up control is conducted such that the vehicle is controlled to run at a desired velocity to maintain the desired inter-vehicle distance between the vehicle itself and the preceding vehicle. More specifically, the throttle opening θTH is reduced to decrease the vehicle velocity to the desired vehicle velocity such that the distance detected by the radar 68 becomes the desired inter-vehicle distance. It should also be noted that when similar deceleration of a predetermined level or greater which cannot be responded to adequately by adjusting the throttle opening is required during preceding vehicle follow-up control, a brake operation or a gear change (downshift) is also performed in conjunction with adjustment of the throttle opening in a closing direction.

If, on the other hand, the determination result is affirmative in S10 or S14, or negative in S12, the program advances to S34 in which the flag F.AC bit is set to 0. When the determination result is affirmative in S16, or in other words when running control is in progress, the program advances to S36 in which a determination is made as to whether or not the accelerate switch 66d is ON (manipulated), or in other words whether the instruction to conduct acceleration control to accelerate the vehicle is required by the operator.

When the determination result in S36 is affirmative, the program advances to S38 in which acceleration control is conducted to increase the throttle opening θTH such that the vehicle velocity is increased by a constant amount. The program then advances to S40 in which the desired vehicle velocity VD is updated to the velocity following the acceleration. If, on the other hand, the determination result in S36 is negative, the program advances to S42 in which it is determined whether the decelerate switch 66e is ON (manipulated), or in other words whether the instruction to conduct deceleration control to decelerate the vehicle is inputted by the operator.

If the determination result in S42 is affirmative, the program advances to S44 in which deceleration control is conducted to decrease the throttle opening θTH such that the vehicle velocity is decreased. The program then advances to S40 in which the desired vehicle velocity VD is updated to the velocity following the deceleration.

If, on the contrary, the determination result in S42 is negative, the program advances to S46 in which it is determined whether the preceding vehicle is approaching within the predetermined inter-vehicle distance. When the determination result in S46 is negative, the program advances to S48 in which cruise control is conducted in accordance with the stored desired vehicle velocity VD, and when the determination result in S46 is affirmative, the program advances to S50 in which preceding vehicle follow-up control is conducted in the manner mentioned above.

Next, referring to FIG. 3 onward, a general switching control operation between the full-cylinder operation and the cut-off cylinder operation will be described.

Figure 3:
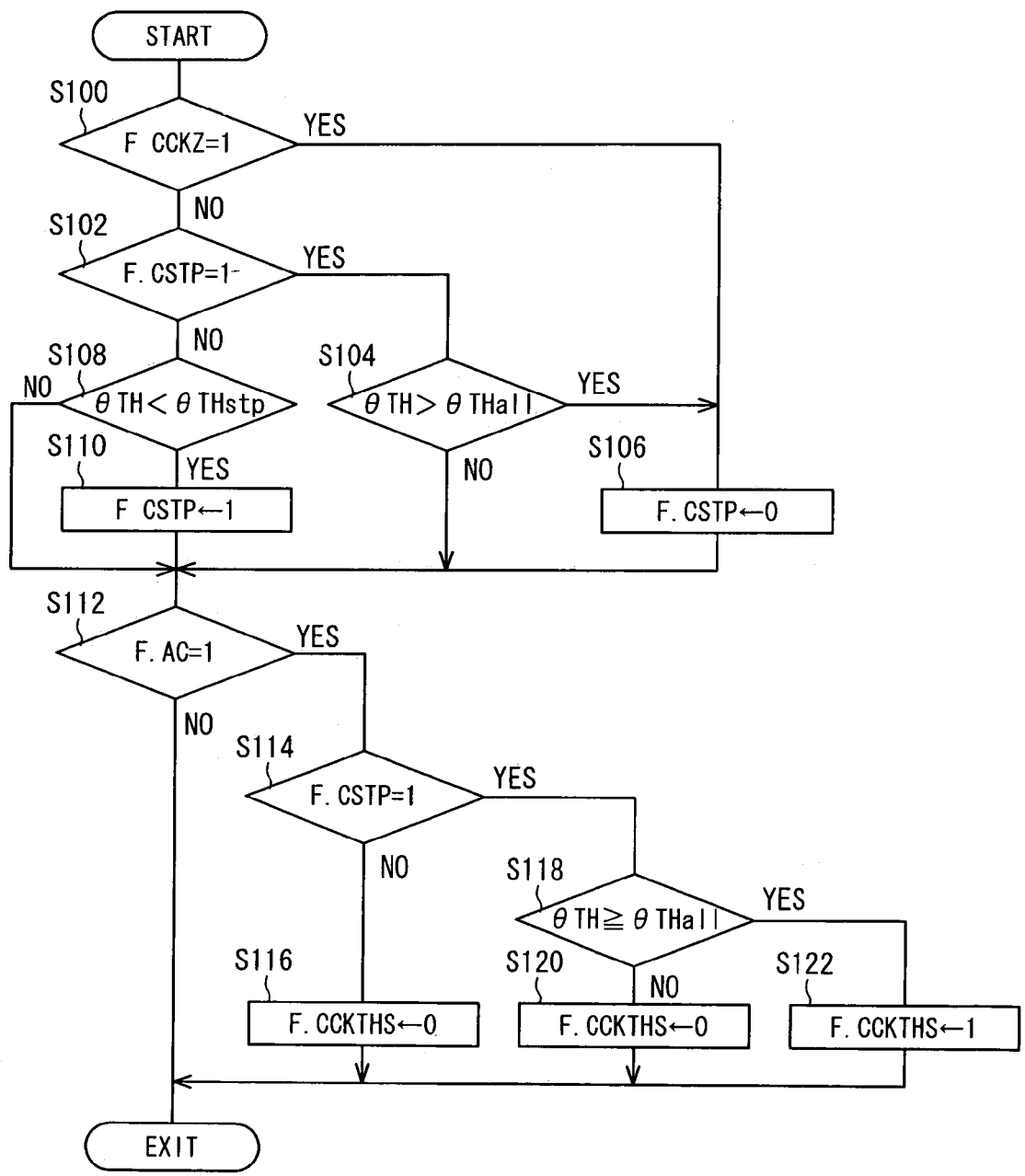
FIG. 3 is a flowchart showing an operation for general switching between a full-cylinder operation and a cut-off cylinder operation from among the operations of the system shown in FIG. 1.

FIG. 3 is a flowchart showing this control operation. The program illustrated in the diagram is also executed (looped) at TDC or a predetermined crank angle in the vicinity thereof, or at predetermined time intervals.

The program begins in S100 in which it is determined whether the bit of a flag F.CCKZ is set to 1. When the bit (initial value 0) is set to 1, it indicates that the full-cylinder operation is required.

When the determination result in S100 is negative, the program advances to S102 in which it is determined whether the bit of a flag F.CSTP (initial value 0) is set to 1. As will be described below, the bit of the flag F.CSTP is set to 1 in a subsequent step and when set to 1, it indicates that the engine 10 should be operated by the cut-off cylinder operation.

If the determination result in S102 is affirmative and it is judged that the cut-off cylinder operation is in progress, the program advances to S104 in which the current (detected) throttle opening θTH is compared with a full-cylinder throttle opening threshold value θTHall for determining whether or not the full-cylinder operation should be conducted, i.e., it is determined whether the detected throttle opening is larger than the threshold θTHall, or in other words whether the load of the engine 10 is large.

When the determination result in S104 is affirmative and it is determined that the load of the engine 10 is large, the program advances to S106 in which the flag F.CSTP bit is reset to 0 and the engine operation is switched to the full-cylinder operation. If, on the other hand, the determination result in S104 is negative, the flag F.CSTP bit remains at 1 and the cut-off cylinder operation is continued.

If the determination result in S102 is negative and it is determined that the full-cylinder operation is underway, the program advances to S108 in which the current throttle opening θTH is compared with a cut-off cylinder throttle opening threshold value θTHstp for determining whether or not the cut-off cylinder operation should be conducted, i.e., it is determined whether the detected value is less than the threshold value θTHstp, or in other words whether the load of the engine 10 is small.

When the determination result in S108 is affirmative and it is determined that the load of the engine 10 is small, the program advances to S110 in which the flag F.CSTP bit is set to 1 and the engine operation is switched to the cut-off cylinder operation. If the determination result in S108 is negative, the flag F.CSTP bit remains at 0 and the full-cylinder operation is continued. When the determination result in S100 is affirmative, the program advances to S106 in which the flag F.CSTP bit is reset to 0 and the full-cylinder operation is continued.

The program then advances to S112 in which it is determined whether the bit of the flag F.AC is set to 1, in other words it is determined whether cruise control or preceding vehicle follow-up control (including acceleration and deceleration control performed by switch operation) is in progress. When the determination result in S112 is affirmative, the program advances to S114 in which it is determined whether the bit of the flag F.CSTP is set to 1. If the determination result is negative and it is judged that the full-cylinder operation is in progress, the program advances to S116 in which the bit of a flag F.CCKTHS is reset to zero.

On the contrary, when the determination result in S114 is affirmative and when it is judged that the cut-off cylinder operation is in progress, the program advances to S118 it is determined whether the detected throttle opening θTH reaches the threshold value θTHall. Note that, it is determined in S104 whether the detected throttle opening θTH is larger than the threshold θTHall and if it is, the program advances to S106 in which the operation is switched to the full-cylinder operation. This indicates that when the detected throttle opening θTH has reached the threshold value θTHall, but if it is not larger than the threshold value θTHall, the cut-off cylinder operation is still in progress.

When the determination result in S118 is negative, the program advances to S120 in which the bit of the flag F.CCKTHS is reset to 0, whilst when the determination result in S118 is affirmative, the program advances to S122 in which the flag bit is set to 1. Thus, to indicate the bit of the flag F.CCKTHS to 1 indicates the operation should be switched to the full-cylinder operation while running control is in progress. When the determination result in S112 is negative, the program skips the processing in S114 to S122, and is immediately terminated.

Next, referring to FIG. 4, the transition control operation for switching from the cut-off cylinder operation to the full-cylinder operation, more specifically a control operation for switching from the cut-off cylinder operation to the full-cylinder when it is under the running condition in which deceleration is required, will be explained.

Figure 4:
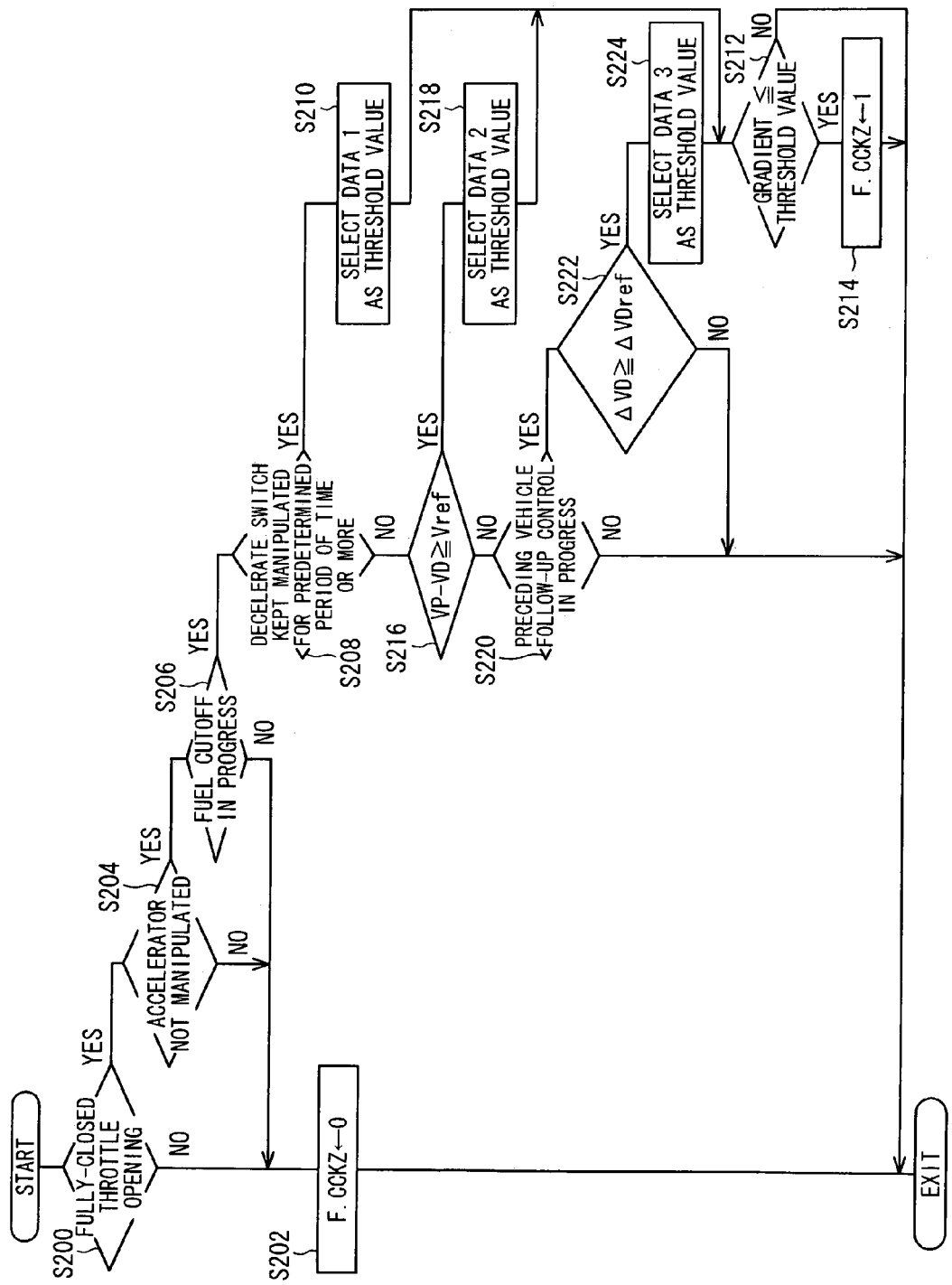
FIG. 4 is a flowchart showing a transition control operation from the cut-off cylinder operation to the full-cylinder operation during execution of running control from among the operations of the system shown in FIG. 1.

FIG. 4 is a flowchart of this operation. The program illustrated in the diagram is executed (looped) when the aforementioned flag F.AC bit is set to 1.

The program begins in S200 in which it is determined whether a throttle opening θTH instructed in the running control is a fully-closed throttle opening. Here, the term "fully-closed throttle opening" indicates not only a completely closed throttle opening, but also an almost closed throttle opening. When the determination result is negative, since this indicates that no deceleration is required by the running controller (ECU 70), in other words, it is not under the running condition in which vehicle needs to decelerate, the program advances to S202 in which the bit of the flag F.CCKZ is reset to 0 and the program is terminated. Accordingly, the engine 10 is operated by the cut-off cylinder operation if the other conditions explained with reference to FIG. 3 are satisfied.

On the other hand, if the determination result in S200 is affirmative, since this indicates deceleration is required by the running controller and hence, it is under the running condition in which the vehicle needs to decelerate, the program advances to S204 in which it is determined whether the accelerator pedal 56 is not manipulated (depressed) by the operator (i.e., the accelerator position AP is zero). When the determination result is negative, since this also indicates that no deceleration is required by the running controller (it is not under the running condition in which vehicle needs to decelerate), the program advances to S202. Here, the accelerator position AP is "zero" indicates that the accelerator pedal 56 is not depressed or is almost not depressed.

If the determination result in S204 is affirmative, since this also indicates deceleration is required by the running controller (it is under the running condition in which the vehicle needs to decelerate), the program advances to S206 in which it is determined whether the fuel cutoff is in progress (i.e., the supply of fuel is discontinued) and if the determination result is negative, the program advances to S202. This is because engine output torque becomes zero if the supply of fuel is cut off. In the control in this embodiment, therefore, in order to utilize the increase of engine loss (pumping loss) obtained by switching the operation to the full-cylinder operation most effectively, switching to the full-cylinder operation is only conducted when the fuel cutoff is in progress.

When the determination result is affirmative in S206, since this also indicates deceleration is required by the running controller (it is under the running condition in which the vehicle needs to decelerate), the program advances to S208 in which it is determined whether the decelerate switch 66e (a device to be manipulated by the operator for inputting the instruction to conduct deceleration control to decelerate the vehicle) is kept manipulated (kept ON) for a predetermined period of time (e.g., 0.5 sec.) or more. This is because the fact that this switch 66e is kept manipulated for the predetermined period of time or more indicates that deceleration is required by the running controller. More specifically, it can be judged that the degree of operator's demand to decelerate is high, (i.e., it is more likely to be under the running condition in which the vehicle needs to decelerate).

When the determination result in S208 is affirmative, therefore, the program advances to S210 in which data 1 is selected as a threshold value and advances to S212 in which a gradient of the road (%) on which the vehicle runs is calculated using an equation mentioned below. Then, the calculated gradient is compared with the selected gradient threshold value (data 1) and it is determined whether the calculated gradient is equal to or less than the threshold value (data 1).

$$\text{gradient (\%)} \approx \sin\theta \times 100$$

$$\approx \left[ \frac{\frac{\gamma \times \eta \times Te}{R} - \frac{\{VP(n) - VP(n-1)\} \times \{M + \Delta M\}}{\Delta t \times 9.8}}{M} - \mu - \frac{\lambda \times VP(n)^2 \times PA}{760 \times M} \right] \times 100$$

In the equation, γ: total gear-reduction ratio in the power transmission system; η: transmission efficiency; Te: generated torque [kg·m]; R: vehicle tire's dynamic radius [m]; VP(n): vehicle velocity [m/s] or [km/h] detected at a current time (detected at a current program loop); VP(n−1): vehicle velocity detected at a preceding time (detected at a preceding program loop); M: vehicle's weight [kg]; ΔM: equivalent mass of vehicle rotation system; Δt: elapsed period of time until VP(n) is detected after VP(n−1) was detected, i.e., program loop intervals of FIG. 4 flow chart [sec.]; μ: rolling resistance; and λ: drag coefficient.

As understood from the above, the value calculated from the vehicle running conditions mentioned in the equation indicates a gradient (incline) of the road on which the vehicle runs. The calculated value becomes a positive value that increases with increasing upgrade of an uphill when the vehicle ascends the uphill, becomes zero when the vehicle runs on a level road, and becomes a negative value that increases with increasing downgrade of a downhill when the vehicle descends the downhill. Here, the data 1 is set to a predetermined positive value indicating a certain upgrade value.

When the determination result in S212 is negative, the program is immediately terminated. However, when the determination result is affirmative, since this indicates that the vehicle runs on one of roads including an uphill (whose upgrade is equal to or less than the data 1), a level road and a downhill, specifically it is determined that the vehicle is under the running condition in which deceleration is required by the running controller, more specifically it is determined that the vehicle is under the running condition in which engine braking effect is needed (i.e., the vehicle needs to decelerate), the program advances to S214 in which the bit of flag F.CCKZ is set to 1 and the program is then terminated. As a result, the operation of the engine 10 is switched to the full-cylinder operation if the other conditions mentioned with reference to FIG. 3 are satisfied.

On the other hand, when the determination result in S208 is negative, the program advances to S216 in which it is determined whether a difference obtained by subtracting the desired vehicle velocity VD from the detected vehicle velocity VP is equal to or greater than a predetermined value Vref, in other words it is determined whether an error between the detected vehicle velocity and the desired vehicle velocity is equal to or greater than the predetermined value Vref.

When the determination result in S216 is affirmative, since this indicates the vehicle is under the running condition in which deceleration is required by the running controller, i.e., the vehicle needs to decelerate (for example, the vehicle descends a downhill), the program advances to S218 in which a data 2 is selected as another threshold value and advances to S212 in which the gradient calculated in the same manner is compared with the selected threshold value (data 2). In anticipation of deceleration during downhill running, the data 2 is set to a predetermined positive value that is less than data 1. The program then advances to S214 or is immediately terminated depending on the result of determination in S212.

When the determination result in S216 is negative, the program advances to S220 in which it is determined whether the preceding vehicle follow-up control is in progress. When the determination result is negative, the program is immediately terminated. On the contrary, if the determination result is affirmative, the program advances to S222 in which it is determined whether change of the desired vehicle velocity ΔVD is equal to or greater than a predetermined value ΔVDref.

As mentioned above, in the preceding vehicle follow-up control, the desired vehicle velocity VD is determined or calculated to maintain a desired inter-vehicle distance between the subject vehicle and a preceding vehicle.

When the determination result in S222 is affirmative, since this may indicate a situation where the vehicle runs on a level road or similar road and it can be supposed that the vehicle is under the running condition in which deceleration is required by the running controller, i.e., the vehicle may need to decelerate, the program advances to S224 in which data 3 is selected as a still another threshold value and advances to S212 in which the gradient calculated in the same manner is compared with the selected threshold value (data 3). In anticipation of deceleration during level road running, the data 3 is set to a predetermined positive value that is less than data 1, but is larger than data 2. The program advances to S214 or is immediately terminated depending on the result of determination in S212.

When determination result is negative in one of S200, S204 and S206, the program advances to S202 and the engine operation is determined to be the cut-off cylinder operation when the other conditions explained with reference to FIG. 3 are satisfied. In other words, after the engine operation has been switched to the full-cylinder operation, when it is determined that deceleration is not required by the running controller, the engine operation is again switched or returned to the cut-off cylinder operation.

This embodiment is configured such that, it is determined whether deceleration is required by the running controller, i.e., it is determined whether it is under the running condition in which the vehicle needs to decelerate, and if it is, the engine operation is switched to the full-cylinder operation provided that the engine 10 is operated under the cut-off cylinder operation. With this, it becomes possible to increase the engine loss and to generate the deceleration as desired.

Specifically, it is determined that deceleration is required (it is under a running condition in which vehicle needs to decelerate) and the engine operation is switched to the full-cylinder operation, when the throttle valve 22 is fully closed or is almost fully closed, and the accelerator pedal 56 is not manipulated by the operator, and the supply of fuel to the engine 10 is cut off (fuel cutoff is in progress), and in addition, the device (decelerate switch 66e) that is manipulated by the operator to input the instruction to conduct deceleration control to decelerate the vehicle is kept manipulated for a predetermined period of time or more, or the difference between the detected vehicle velocity VP and the desired vehicle velocity VD is equal to or greater than the predetermined value (VPref), or change of the desired vehicle velocity (ΔVD) is equal to or greater than the predetermined value (ΔVDref) when the preceding vehicle follow-up control is in progress, more specifically, when at least one of the three conditions mentioned just above is satisfied and when the gradient of the road (on which the vehicle runs) is equal to or less than the predetermined threshold value. With this, it becomes to generate the deceleration as desired when the vehicle needs to decelerate, in other words, when it is under the running condition in which an engine braking effect is needed.

Further, after the engine operation is switched to the full-cylinder operation, when it is determined that deceleration is not required by the running controller, engine operation is switched to the cut-off cylinder operation. With this, since the engine loss (pumping loss) is decreased in the cylinder cut-off operation, the vehicle decelerates not sharply, rather moderately, thereby preventing the operator from having a discomfort feel. In addition, when the supply of fuel is resumed, since engine operation is switched to the cut-off cylinder operation (S206, S202), the fuel consumption is improved.

Further, the control mentioned above does not conflict with those of the running controller that conducts cruise control and preceding vehicle follow-up control and when it is determined that deceleration is required by the running controller, e.g., when the instruction to decelerate is inputted by the operator, it becomes possible to achieve the deceleration as desired.

It should be noted in the above, although it is determined that deceleration is required (it is under a running condition that vehicle needs to decelerate) and the engine operation is switched to the full-cylinder operation, when the throttle valve 22 is fully closed or is almost fully closed, and the accelerator pedal 56 is not manipulated by the operator, and the supply of fuel to the engine 10 is cut off, and in addition, when at least one of the three conditions including the device (decelerate switch 66e) is kept manipulated for a predetermined period of time or more, the difference between the detected vehicle velocity VP and the desired vehicle velocity VD is equal to or greater than the predetermined value (VPref), and change of the desired vehicle velocity VD is equal to or greater than the predetermined value (ΔVDref)

when the preceding vehicle follow-up control is in progress, the embodiment should not be limited thereto. Rather, it is alternatively possible to determine that the vehicle needs to decelerate and to switch to the full-cylinder operation, even if the conditions are not satisfied as mentioned above. For example, even if the supply of fuel is not cut off, it is alternatively possible to switch the engine operation the full-cylinder operation.

This embodiment is thus configured to have a system for controlling an internal combustion engine (10) having a plurality of cylinders and mounted on a vehicle, comprising: an engine operation controller (ECU 70, S100 to S122, S200 to S224) that conducts a switching control of engine operation based on a load of the engine (e.g., throttle opening θTH) between a full-cylinder operation in which all of the cylinders are operative and a cut-off cylinder operation in which some of the cylinders are inoperative; and a running controller (ECU 70, S10 to S50) that conducts a running control of the vehicle; wherein the engine operation controller switches engine operation to the full-cylinder operation (S214) when it is determined that deceleration is required by the running controller (S200, S204 to S212, S216 to S224). With this, it becomes possible to increase the engine loss and to generate the deceleration as desired.

In the system, the running controller conducts the running control that includes at least one of a cruise control in which the vehicle runs at a desired vehicle velocity and a preceding vehicle follow-up control in which the vehicle runs at a desired vehicle velocity to maintain a desired inter-vehicle distance from a preceding vehicle (S10 to S50). With this, without causing interference with the running control, it becomes possible to generate the deceleration as desired when the deceleration is required by the running controller (i.e., when required by the operator).

Specifically, the engine operation controller determines that deceleration is required by the running controller and switches engine operation to the full-cylinder operation when a device (decelerate switch 66e) that is manipulated by an operator to input the instruction to decelerate the vehicle is kept manipulated for a predetermined period of time or more (S208, S214). With this, it becomes possible to generate the deceleration when the deceleration is required by the operator.

Specifically, the engine operation controller determines that deceleration is required by the running controller and switches engine operation to the full-cylinder operation when a difference between a detected vehicle velocity (VP) and the desired vehicle velocity (VD) is equal to or greater than a predetermined value (Vref) (S126, S214). With this, it becomes possible to generate the deceleration in a case that the vehicle descends a downhill and the deceleration is needed.

Specifically, the engine operation controller determines that deceleration is required by the running controller and switches engine operation to the full-cylinder operation when change (ΔVD) of the desired vehicle velocity (VD) is equal to or greater than a predetermined value (ΔVDref), more specifically, when the preceding vehicle follow-up control is in progress (S222, S214). With this, it becomes possible to generate the deceleration in a case that the vehicle needs to decelerate sharply during the preceding when the preceding vehicle follow-up control is in progress.

Specifically, the engine operation controller determines that deceleration is required by the running controller and switches engine operation to the full-cylinder operation when a gradient of a road on which the vehicle runs is equal to or less than a predetermined threshold value (S210, S212, S214, S218, S224). With this, it becomes possible to increase the engine loss to generate the deceleration as desired, by producing engine braking effect.

Specifically, the engine operation controller determines that deceleration is required by the running controller and switches engine operation to the full-cylinder operation if a throttle valve is fully closed or is almost fully closed when the running control is in progress (S200, S214). With this, it becomes possible to generate the deceleration as desired under the running condition in which the vehicle needs to decelerate.

Specifically, the engine operation controller determines that deceleration is required by the running controller and switches engine operation to the full-cylinder operation when an accelerator pedal is not manipulated by an operator (S204, S214). With this, it becomes possible to generate the deceleration as desired under the running condition in which the vehicle needs to decelerate.

Specifically, the engine operation controller determines that deceleration is required by the running controller and switches engine operation to the full-cylinder operation when a supply of fuel to the engine is cut off (S206, S214). Since the engine output torque becomes zero if the supply of fuel is cut off, by utilizing the increase of engine loss (pumping loss) obtained by switching the operation to the full-cylinder operation most effectively, it becomes possible to most effectively generate the deceleration as desired under the running condition in which the vehicle needs to decelerate.

Specifically, the engine operation controller switches engine operation to the cut-off cylinder operation when it is determined that deceleration is not required by the running controller, after switching engine operation to the full-cylinder operation (S200, S204, S206, S202). With this, since the engine loss (pumping loss) is decreased in the cylinder cut-off operation, the vehicle decelerates not sharply, rather moderately, thereby preventing the operator from having a discomfort feel. In addition, when the supply of fuel is resumed, since engine operation is switched to the cut-off cylinder operation, the fuel consumption is improved.

It should be noted in the above that, although the gradient of road is determined using the equation, it is alternatively possible to determine by installing a gradient sensor(s) on the vehicle and by using a value detected therefrom. It is still alternatively possible to use the technique proposed by the assignee to use a plurality of maps to determine whether the vehicle ascends/descends a hill or runs on a level road.

It should also be noted in the above that, although the throttle opening θTH is used as a parameter indicative of the load of the engine 10, a desired torque may instead be used. In an engine in which fuel is directly injected into cylinder, for example, in other words a spark ignition engine in which gasoline fuel is injected directly into a combustion chamber or a compression ignition engine, the desired torque is usually determined from the engine speed, accelerator position, and so on. In such a type of engine, the desired torque may be used in lieu of the throttle opening. The same also applies to electric vehicles and the like.

It should further be noted in the above that, although cruise control and preceding vehicle follow-up control (inter-vehicle distance control) are described as examples of the running control, this invention may be applied to a case in which cruise control alone is conducted.

The entire disclosure of Japanese Patent Application No.2003-49877 filed on Feb. 26, 2003, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling an internal combustion engine having a plurality of cylinders and mounted on a vehicle, comprising:
   an engine operation controller that conducts a switching control of engine operation based on a load of the engine between a full-cylinder operation in which all of the cylinders are operative and a cut-off cylinder operation in which some of the cylinders are inoperative; and
   a running controller that conducts a running control of the vehicle including at least one of a cruise control in which the vehicle runs at a desired vehicle velocity and a preceding vehicle follow-up control in which the vehicle runs at a desired vehicle velocity to maintain a desired inter-vehicle distance from a preceding vehicle;
   wherein the engine operation controller switches engine operation to the full-cylinder operation if it is determined that deceleration is required by the running controller when the running controller conducts at least one of the cruise control and the preceding vehicle follow-up control, and
   wherein the engine operation controller switches engine operation to the full-cylinder operation if deceleration is required by the running controller when a supply of fuel to the engine is cut off.

2. A system according to claim 1, wherein the engine operation controller determines that deceleration is required by the running controller and switches engine operation to the full-cylinder operation when a device that is manipulated by an operator to input the instruction to decelerate the vehicle is kept manipulated for a predetermined period of time or more.

3. A system according to claim 1, wherein the engine operation controller determines that deceleration is required by the running controller and switches engine operation to the full-cylinder operation when a difference between a detected vehicle velocity and the desired vehicle velocity is equal to or greater than a predetermined value.

4. A system according to claim 1, wherein the engine operation controller determines that deceleration is required by the running controller and switches engine operation to the full-cylinder operation when change of the desired vehicle velocity is equal to or greater than a predetermined value.

5. A system according to claim 1, wherein the engine operation controller determines that deceleration is required by the running controller and switches engine operation to the full-cylinder operation if change of the desired vehicle velocity is equal to or greater than a predetermined value when the preceding vehicle follow-up control is in progress.

6. A system according to claim 1, wherein the engine operation controller determines that deceleration is required by the running controller and switches engine operation to the full-cylinder operation when a gradient of a road on which the vehicle runs is equal to or less than a predetermined gradient threshold value.

7. A system according to claim 1, wherein the engine operation controller determines that deceleration is required by the running controller and switches engine operation to the full-cylinder operation if a throttle valve is fully closed or is almost fully closed when the running control is in progress.

8. A system according to claim 1, wherein the engine operation controller determines that deceleration is required by the running controller and switches engine operation to the full-cylinder operation when an accelerator pedal is not manipulated by an operator.

9. A system according to claim 1, wherein the engine operation controller switches engine operation to the cut-off cylinder operation when it is determined that deceleration is not required by the running controller, after switching engine operation to the full-cylinder operation.

10. A method of controlling an internal combustion engine having a plurality of cylinders and mounted on a vehicle, comprising the steps of:
    conducting a switching control of engine operation based on a load of the engine between a full-cylinder operation in which all of the cylinders are operative and a cut-off cylinder operation in which some of the cylinders are inoperative; and
    conducting a running control of the vehicle including at least one of a cruise control in which the vehicle runs at a desired vehicle velocity and a preceding vehicle follow-up control in which the vehicle runs at a desired vehicle velocity to maintain a desired inter-vehicle distance from a preceding vehicle;
    wherein the step of engine operation control switches engine operation to the full-cylinder operation if it is determined that deceleration is required by the step of running control when the running controller conducts at least one of the cruise control and the preceding vehicle follow-up control, and
    wherein the step of engine operation control switches engine operation to the full-cylinder operation if deceleration is required by the step of running control when a supply of fuel to the engine is cut off.

11. A method according to claim 10, wherein the step of engine operation control determines that deceleration is required by the step of running control and switches engine operation to the full-cylinder operation when a device that is manipulated by an operator to input the instruction to decelerate the vehicle is kept manipulated for a predetermined period of time or more.

12. A method according to claim 10, wherein the step of engine operation control determines that deceleration is required by the step of running control and switches engine operation to the full-cylinder operation when a difference between a detected vehicle velocity and the desired vehicle velocity is equal to or greater than a predetermined value.

13. A method according to claim 10, wherein the step of engine operation control determines that deceleration is required by the step of running control and switches engine operation to the full-cylinder operation when change of the desired vehicle velocity is equal to or greater than a predetermined value.

14. A method according to claim 10, wherein the step of engine operation control determines that deceleration is required by the step of running control and switches engine operation to the full-cylinder operation if change of the desired vehicle velocity is equal to or greater than a predetermined value when the preceding vehicle follow-up control is in progress.

15. A method according to claim 10, wherein the step of engine operation control determines that deceleration is required by the step of running control and switches engine operation to the full-cylinder operation when a gradient of a road on which the vehicle runs is equal to or less than a predetermined gradient threshold value.

16. A method according to claim 10, wherein the step of engine operation control determines that deceleration is required by the step of running control and switches engine operation to the full-cylinder operation if a throttle valve is fully closed or is almost fully closed when the running control is in progress.

17. A method according to claim 10, wherein the step of engine operation control determines that deceleration is required by the step of running control and switches engine operation to the full-cylinder operation when an accelerator pedal is not manipulated by an operator.

18. A method according to claim 10, wherein the step of engine operation control switches engine operation to the cut-off cylinder operation when it is determined that deceleration is not required by the step of running control, after switching engine operation to the full-cylinder operation.

* * * * *